(12) United States Patent
Kohara et al.

(10) Patent No.: US 7,684,721 B2
(45) Date of Patent: Mar. 23, 2010

(54) IMAGE FORMING DEVICE AND IMAGE INPUT DEVICE

(75) Inventors: Tasuku Kohara, Kanagawa (JP); Takashi Inoue, Saitama (JP); Hiroshi Takeda, Chiba (JP); Kenichi Yamada, Kanagawa (JP); Taisuke Omi, Kanagawa (JP); Kazuo Koike, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 109 days.

(21) Appl. No.: 11/913,802

(22) PCT Filed: Mar. 12, 2007

(86) PCT No.: PCT/JP2007/055326

§ 371 (c)(1),
(2), (4) Date: Nov. 7, 2007

(87) PCT Pub. No.: WO2007/108402

PCT Pub. Date: Sep. 27, 2007

(65) Prior Publication Data

US 2008/0199201 A1 Aug. 21, 2008

(30) Foreign Application Priority Data

Mar. 15, 2006 (JP) .............................. 2006-070121

(51) Int. Cl.
*G03G 15/00* (2006.01)
*G03G 21/00* (2006.01)
(52) U.S. Cl. ........................................ 399/81; 399/107
(58) Field of Classification Search .................. 399/81, 399/1, 107; 358/498
See application file for complete search history.

(56) References Cited

U.S. PATENT DOCUMENTS

| 4,618,870 | A | 10/1986 | Inoue | 347/175 |
|---|---|---|---|---|
| 4,639,741 | A | 1/1987 | Inoue | 347/182 |
| 4,675,697 | A | 6/1987 | Sasaki et al. | 347/182 |
| 6,445,836 | B1 * | 9/2002 | Fujiwara | 382/312 |
| 7,336,911 | B2 * | 2/2008 | Maeda | 399/81 |
| 7,362,418 | B2 * | 4/2008 | Yasuda | 358/498 |
| 7,366,436 | B2 * | 4/2008 | Akiyama et al. | 399/81 |

FOREIGN PATENT DOCUMENTS

| JP | 55-6986 | 1/1980 |
|---|---|---|
| JP | 5-307281 | 11/1993 |
| JP | 11-167331 | 6/1999 |

(Continued)

OTHER PUBLICATIONS

Machine translation of JP 11-194566 A dated May 31, 2009.*

*Primary Examiner*—Sophia S Chen
(74) *Attorney, Agent, or Firm*—Oblon, Spivak, McClelland, Maier & Neustadt, L.L.P.

(57) ABSTRACT

In an image forming device which acquires image information of a document and forms an image on a recording sheet, an image forming device body has a first reading unit and a processing unit, wherein the first reading unit acquires image information of a document and the processing unit forms an image on a recording sheet based on the image information. An image input device has a second reading unit which acquires image information of a document. The image input device is arranged in the image forming device body at a position lower than a position of the first reading unit.

16 Claims, 16 Drawing Sheets

FOREIGN PATENT DOCUMENTS

| | | |
|---|---|---|
| JP | 11-194566 | 7/1999 |
| JP | 2000-39770 | 2/2000 |
| JP | 2000-214731 | 8/2000 |
| JP | 2002 361968 | 12/2002 |
| JP | 2003 98908 | 4/2003 |
| JP | 2004 21179 | 1/2004 |
| JP | 2004-145121 A * | 5/2004 |
| JP | 2004-272296 | 9/2004 |
| JP | 2004-286880 | 10/2004 |
| JP | 2005-010394 | 1/2005 |
| JP | 2005 86751 | 3/2005 |
| JP | 2005-099567 | 4/2005 |
| JP | 2005-164681 | 6/2005 |
| JP | 2005-300872 | 10/2005 |
| JP | 2006 10866 | 1/2006 |

* cited by examiner

IMAGE FORMING DEVICE AND IMAGE INPUT DEVICE

TECHNICAL FIELD

This invention generally relates to an image forming device and an image input device, and more particularly to an image forming device which acquires image information of a document and forms an image on a recording sheet, and an image input device which inputs information relating to a job performed by the image forming device.

BACKGROUND ART

In recent years, with the advance of medical technology and the yearly increase of average life time, it is a matter of course that disabled persons who are unable to use a part of their body properly would maintain the social life if they use auxiliary tool, such as a wheelchair, etc. The opportunity for the handicapped, elderly people, etc. to take part in the society is being increased.

In view of such a background, barrier-free environment for eliminating the inconveniences that the handicapped, elderly people, etc. feel in the social life is promoted. As for office automation (OA) equipment, such as image forming devices used in companies, public institutions, etc., there have been made various proposals for meeting the demand for barrier-free environment.

For example, Japanese Laid-Open Patent Applications No. 2000-214731 and No. 2005-010394 disclose an image forming device which is adapted for lifting or lowering an image forming device body so that the position of an image reading part provided in the image forming device can be moved up and down. In the image forming device of this type, the lower limit of the image reading part in the movable range depends on the height of the image forming device body, and it is difficult to allow a person who sits on a wheelchair to fully gain access to the image reading part from that condition. Moreover, the lifting or lowering mechanism will be made large with larger size of image forming device, and it will cause the cost of the entire image forming device to be increased.

Japanese Laid-Open Patent Applications No. 2005-300872 and No. 2005-099567 disclose an image forming device in which the image reading part can be lifted or lowered to the image forming device body. Since the moving mechanism in the image forming device of this type is lightweight and small in size, the lifting or lowering mechanism will not be made large. However, the lower limit of the image reading part in the movable range depends on the height of the image forming device body as in the type mentioned above, and it is difficult to allow a person who sits on a wheelchair to fully gain access to the image reading part from that condition.

Furthermore, Japanese Laid-Open Patent Application No. 11-194566 discloses an image forming device in which an image reading part of drawer type is arranged at an arbitrary position of the image forming device body, in order to gain access to the image reading part. However, when installing an image forming device in any of various installing locations, such as companies or public institutions, where the image forming device may be used by unspecified users, it is desirable that all people not only the handicapped or elderly people who use the auxiliary tool but also healthy person are able to use the image forming device without stress or inconvenience. Therefore, it is not appropriate that the height of the image reading part is fixed to one specific location depending on the installed location of the image forming device.

DISCLOSURE OF THE INVENTION

According to one aspect of the invention, there is provided an improved image forming device in which the above-mentioned problems are eliminated.

According to one aspect of the invention, there is provided an image forming device which is adapted for improving the ease of operation.

According to one aspect of the invention, there is provided an image input device which is adapted for improving the ease of operation, without causing enlargement and high cost of the image forming device.

In an embodiment of the invention which solves or reduces one or more of the above-mentioned problems, there is provided an image forming device which acquires image information of a document and forms an image on a recording sheet, the image forming device comprising: an image forming device body having a first reading unit and a processing unit, wherein the first reading unit acquires image information of a document and the processing unit forms an image on a recording sheet based on the image information acquired by the first reading unit; and an image input device having a second reading unit, the second reading unit acquiring image information of a document, and the image input device being arranged in the image forming device body at a position lower than a position of the first reading unit.

The above-mentioned image forming device may be configured so that the image input device comprises an interface which inputs a command to the image forming device body.

The above-mentioned image forming device may be configured so that the image input device is provided so that the image input device is capable of being pushed in the image forming device body or pulled out from the image forming device body.

The above-mentioned image forming device may be configured so that the image forming device body is provided with a plurality of mounting mechanisms to which a plurality of sheet feeding trays, each containing a plurality of recording sheets, are detachably mounted respectively, and the image input device is detachably mounted to one of the plurality of mounting mechanisms.

The above-mentioned image forming device may be configured so that the processing unit is provided with a printer which prints an image on a recording sheet, and the image input device is arranged at a position lower than a position of the printer.

The above-mentioned image forming device may be configured so that the image input device is provided so that the image input device is rotatable, when the image input device is pulled out from the image forming device body, around an axis perpendicular to both a pull-out direction of the image input device and a vertical direction.

The above-mentioned image forming device may be configured so that the image input device is provided to be rotatable around an axis which is perpendicular to both a pull-out direction of the image input device and a vertical direction, and the image input device is provided with a document holding plate which holds a document placed on the second reading unit.

The above-mentioned image forming device may be configured so that the mounting mechanism comprises a locking mechanism which regulates pushing and pulling of the image input device to and from the image forming device body.

The above-mentioned image forming device may be configured so that the image forming device body is provided with a control device which controls the processing unit, and the image input device is electrically connected to the control device when the image input device is attached to the image forming device body.

The above-mentioned image forming device may be configured so that the control device is provided so that, when the image input device is pulled out from the image forming device body, the control device performs only processing based on a command inputted to the interface.

The above-mentioned image forming device may be configured so that the control device is provided to acquire, when the image input device is attached to the image forming device, information relating to the image input device.

The above-mentioned image forming device may be configured so that the interface comprises a touch panel which is provided so that a displaying direction is capable of being changed.

The above-mentioned image forming device may be configured so that the displaying direction is changed by rotating the displaying direction 90 degrees.

The above-mentioned image forming device may be configured so that the displaying direction is changed by a single pressing action.

In an embodiment of the invention which solves or reduces one or more of the above-mentioned problems, there is provided an image input device for use in an image forming device, the image input device inputting information relating to an image forming job which is executed by the image forming device, the image input device comprising: a holding member which is detachably mounted to a sheet-feeding-tray mounting part provided in the image forming device; and an image input device body provided in the holding member so that the image input device body is capable of entering or leaving the holding member.

The above-mentioned image input device may be configured so that the image input device body is provided with a scanner which reads image information of a document.

The above-mentioned image input device may be configured so that the image input device body is provided with an interface which inputs a command relating to the image forming job.

The above-mentioned image forming device may be configured so that the holding member is provided with a locking mechanism which regulates pushing and pulling of the image input device body to and from the holding member.

According to the embodiment of the image forming device of the invention, the image forming device is provided with the image input device which comprises the second reading unit and is arranged in the image forming device body at a position lower than a position of the first reading unit. Therefore, it is possible to input image information of a document from the lower position which is different from the position of the first reading part in the image forming device, and it is possible to improve the ease of operation of the image forming device.

According to the embodiment of the image input device of the invention, the image input device comprises a holding member which is detachably mounted to a sheet-feeding-tray mounting part of the image forming device, and an image input device body provided in the holding member. The information relating to an image forming job can be inputted from the position corresponding to the position of the sheet-feeding-tray mounting part if the image input device is attached to the image forming device in advance.

Since the holding member of the image input device is detachably mounted to the sheet-feeding-tray mounting part, there is no need for making design changes in the case of attaching the image input device to the existing image forming device. It is possible to avoid causing enlargement and high cost of the image forming device. In addition, when there is no need to input an image using the second reading unit, the image input device body may be accommodated in the holding member or the image input device may be detached from the image forming device. Therefore, it is possible to secure the work space in the vicinity of the image forming device effectively.

BEST MODE FOR CARRYING OUT THE INVENTION

A description will now be given of an embodiment of the invention with reference to the accompanying drawings.

Figure 1:
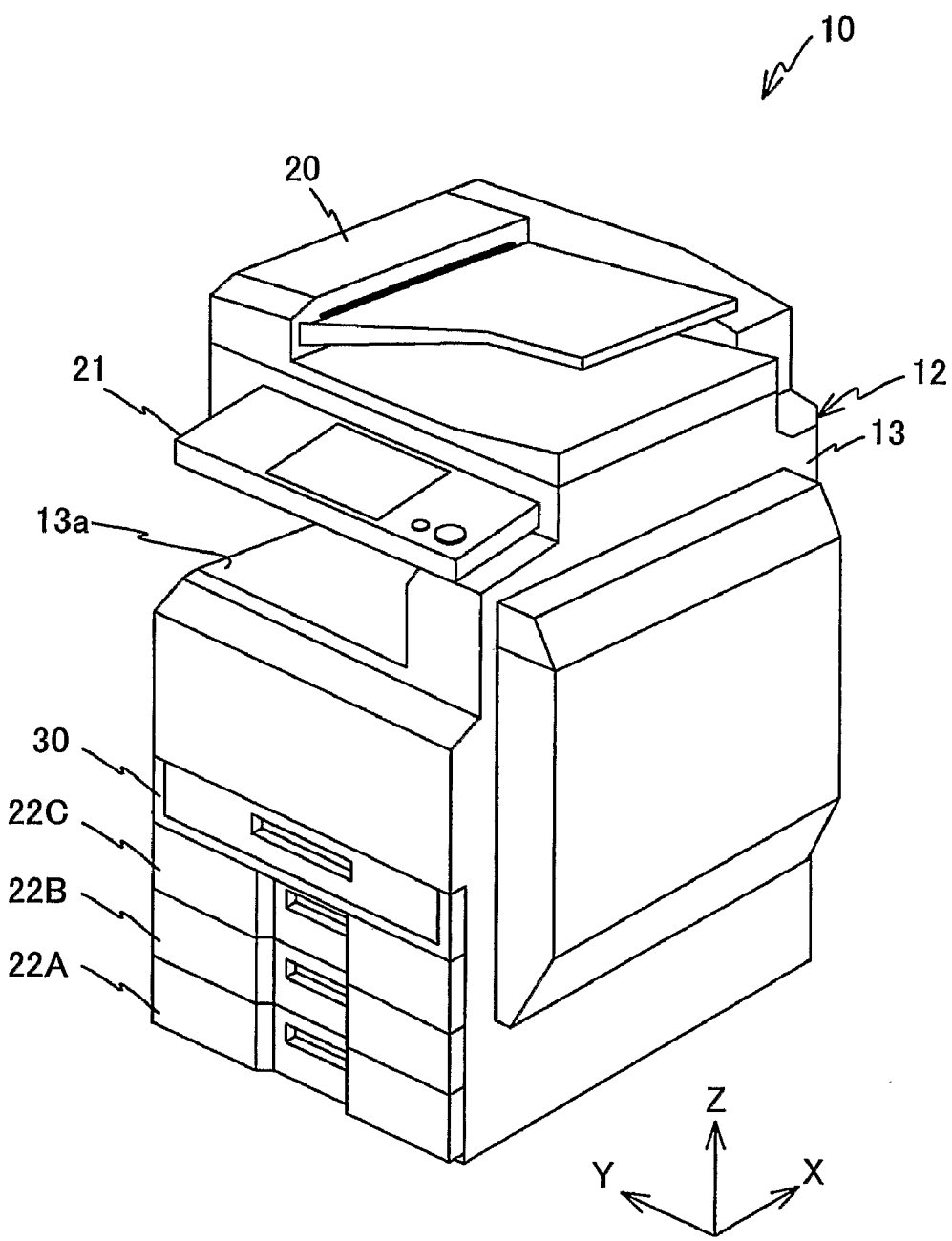
FIG. 1 is a perspective view of an image forming device 10 in an embodiment of the invention.

FIG. 1 shows the composition of an image forming device (copier) 10 in an embodiment of the invention. As shown in FIG. 1, the image forming device 10 of this embodiment includes an image forming device body 12 having a generally rectangular shape, a sheet feeder 20 provided on the top surface of the image forming device body 12, an operation panel 21 fixed to the top end of the front surface (on the −X side surface in FIG. 1) of the image forming device body 12, an image input device 30 provided in the lower front-surface part of the image forming device body 12, and a set of sheet feeding trays 22A, 22B, and 22C provided under the image input device 30.

Figure 2:
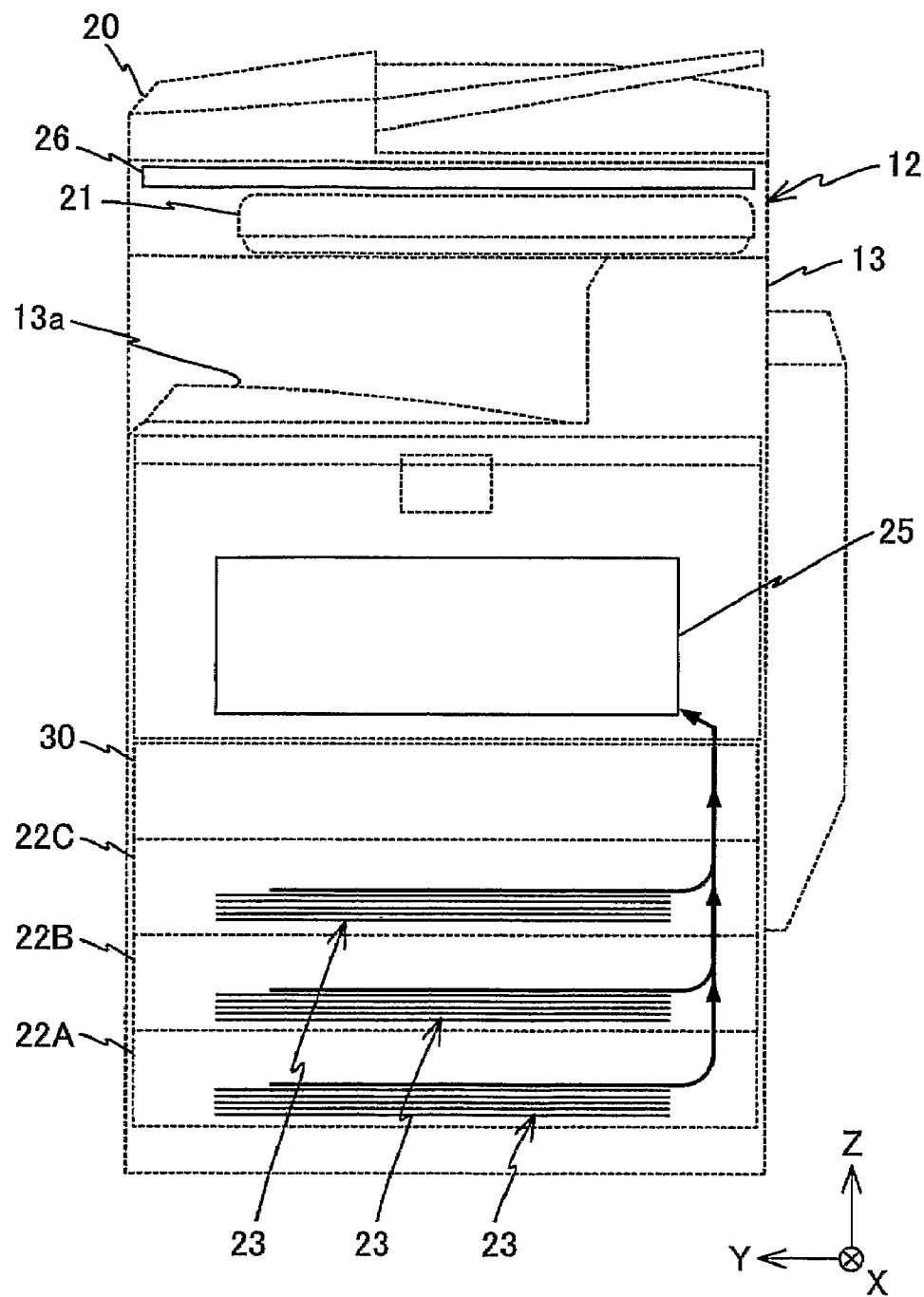
FIG. 2 is a diagram showing the layout of the inside of the body of the image forming device in FIG. 1.

FIG. 2 shows the layout of the inside of the body of the image forming device 12 in FIG. 1. As shown in FIG. 2, the image forming device body 12 includes a chamber 13, a scanner 26, a printer 25, and a main controller 100 (see FIG. 11). The chamber 13 includes a hollow component having a generally rectangular shape and having the longitudinal direction parallel to the Z axis direction, and a paper output tray 13a is provided above the center part of the chamber 13. The scanner 26 is arranged above the chamber 13. The printer 25 is arranged under the paper output tray 13a. The main controller 100 (see FIG. 11) is provided to control the respective components of the image forming device 10.

In the scanner 26, the reading part which scans a document is arranged so that it is exposed from the top surface of the chamber 13. The reading part scans the document sent from the sheet feeder 20, acquires image information of the document, and supplies the image information to the main controller 100.

The printer 25 prints an image on a recording sheet 23 supplied through a sheet feeding mechanism (not shown), based on the image information acquired by the scanner 26, and delivers the recording sheet 23 on which the image is printed to the paper output tray 13a.

For example, the chamber 13 is made of an integral resin material which is formed by injection molding. A set of rectangular openings in which the sheet feeding trays 22A-22C and the image input device 30 are inserted are provided under the front-surface side of the chamber 13.

Figure 3:
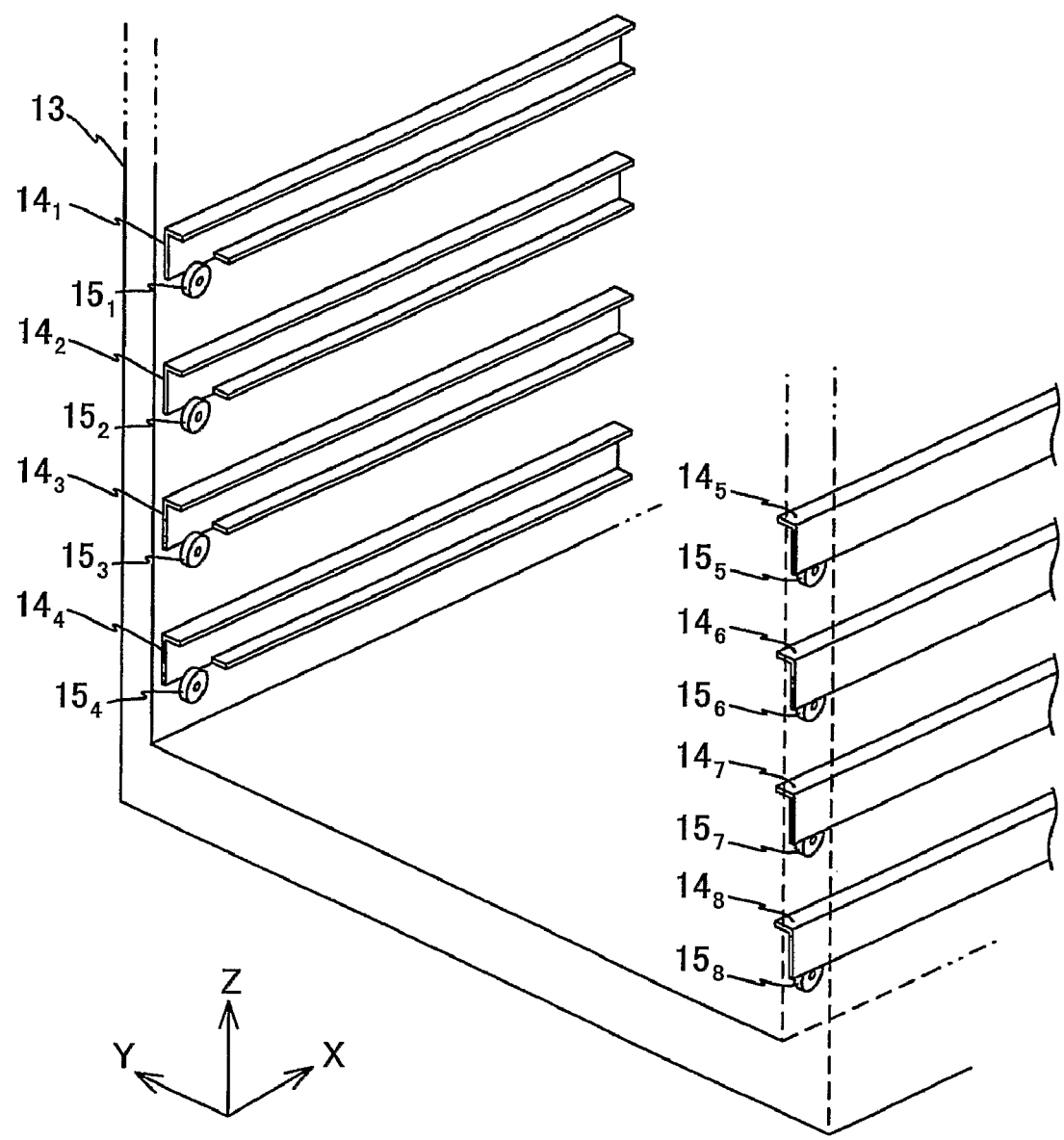
FIG. 3 is a diagram for explaining the arrangement of guide members provided in the inside of a chamber.

FIG. 3 is a diagram for explaining the arrangement of guide members provided in the inside of the chamber 13. As shown in FIG. 3, four guide members $14_1$-$14_4$ having the longitudinal direction parallel to the X axis direction are provided on the +Y side internal wall of the chamber 13, and the guide members $14_1$-$14_4$ are arranged so that they are separated at equal intervals in the Z-axis direction. And four guide members $14_5$-$14_8$ which are opposed to the guide members $14_1$-$14_4$ are provided on the −Y side internal wall of the chamber 13, and the guide members $14_5$-$14_8$ are arranged so that they are separated at equal intervals in the Z-axis direction. Each of the guide members $14_1$-$14_8$ is a component having a U-shaped cross-section and including a fixed portion having a rectangular shape and fixed to the chamber 13, and a pair of parallel guide parts which are connected to the upper end and the lower end of the fixed portion. Eight guide idlers $15_1$-$15_8$ which are rotatable around an axis parallel to the Y-axis direction are respectively provided near the −X side edges of the guide members $14_1$-$14_8$.

Referring back to FIG. 1, the sheet feeding tray 22A is constituted by, for example, a tray which has a rectangular bottom plate part and a frame part provided along the periphery of the top surface of the bottom plate part. And the slide parts (not illustrated) which are slidable on the guide members $14_1$-$14_8$ fixed to the chamber 13 are formed on the outside surfaces on the +Y and −Y sides of the frame shape part, respectively. The slide parts of the sheet feeding tray 22A are mounted to the guide member $14_4$ and the guide member $14_8$ through the guide idler $15_4$ and the guide idler $15_8$ of the chamber 13, and the sheet feeding tray 22A is detachably accommodated in the chamber 13 such that it may be pulled out in the −X direction.

The sheet feeding tray 22B and the sheet feeding tray 22C also have the same structure as that of the sheet feeding tray 22A. The slide parts provided in the frame shape part of each sheet feeding tray are mounted to the guide members $14_3$,$14_7$ and the guide members $14_2$,$14_6$, and the sheet feeding trays 22B and 22C are detachably accommodated in the chamber 13 such that they may be pulled out in the −X direction.

In this embodiment, as shown in FIG. 1, the sheet feeding trays 22A, 22B, and 22C are arranged in this order from the bottom part to the upper part, but each of the sheet feeding trays 22A-22C can be mounted to any of the guide members $14_1$-$14_8$. In the following, for the sake of convenience of description, the accommodated position determined by the guide member $14_1$ and the guide member $14_5$ will be called the first accommodated position, the accommodated position determined by the guide member $14_2$ and the guide member $14_6$ will be called the second accommodated position, the accommodated position determined by the guide member $14_3$ and the guide member $14_7$ will be called the third accommodated position, and the accommodated position determined by the guide member $14_4$ and the guide member $14_8$ will be called the fourth accommodated position.

Figure 4:
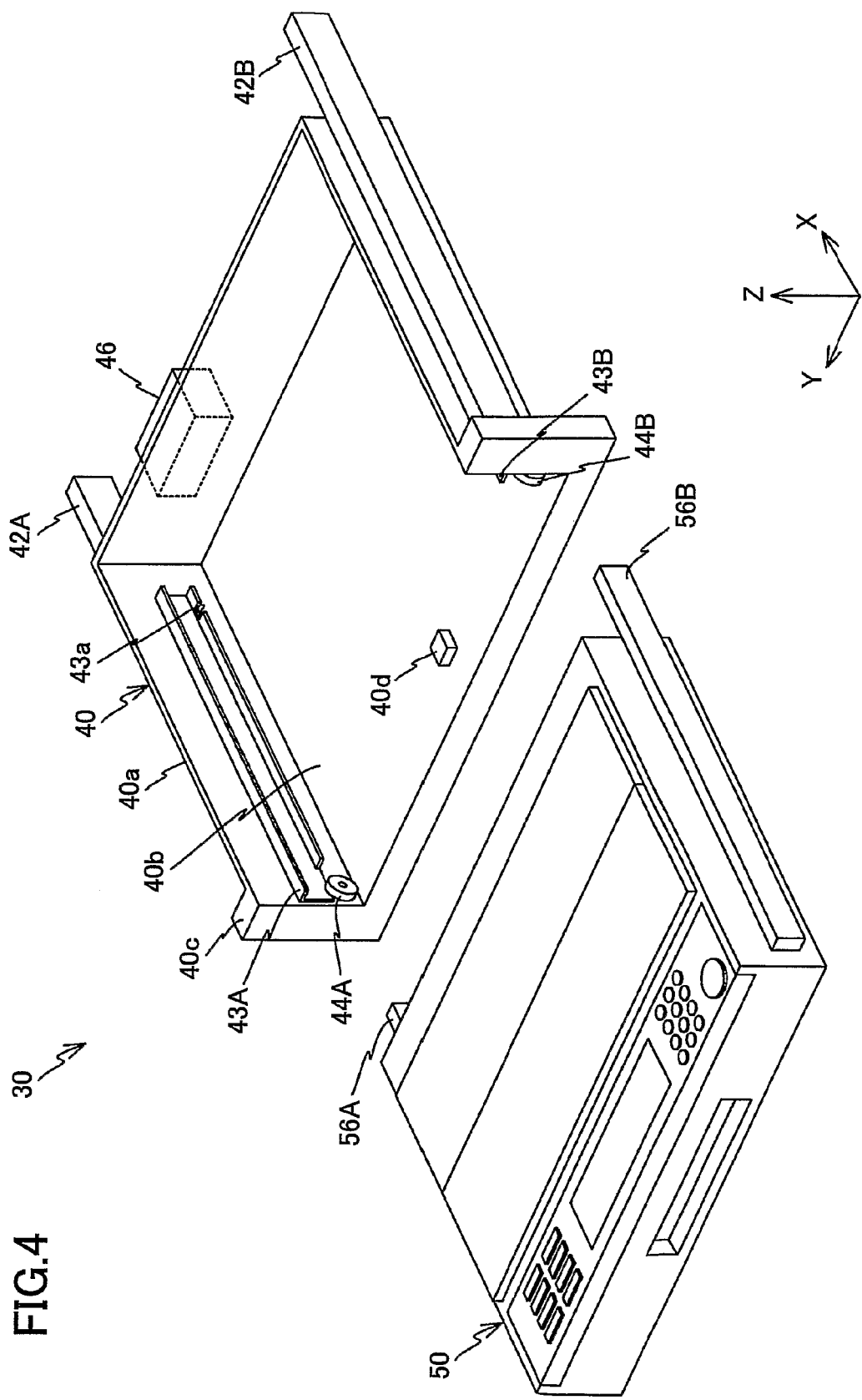
FIG. 4 is an exploded perspective view of an image input device in an embodiment of the invention.

FIG. 4 is an exploded perspective view of an image input device in an embodiment of the invention. As shown in FIG. 4, the image input device 30 of this embodiment includes a base 40 and an image input device body 50. The base 40 is made of an integral resin material which is formed by injection molding. The base 40 includes a bottom plate part 40b having a rectangular cross-section and having the longitudinal direction parallel to the Y axis direction, a frame part 40a having a U-shaped cross-section and extending along the +Y and −Y side edges and the +X side edge of the bottom plate part 40b in the X- and Y-axis directions, a flange part 40c along the −X side edge part of the bottom plate part 40b and the −Z side edge part of the frame part 40a, and a connecting portion 40d formed on the top surface of the bottom plate part 40b near the middle of the −X side edge part of the bottom plate part 40b.

A pair of sliding member 42A and sliding member 42B having the longitudinal direction parallel to the X axis direction are attached to the +Y and −Y side outside surfaces of the frame part 40a of the base 40, and a connector 46 is attached to the +X side outside surface of the frame part 40a.

A pair of guides 43A and 43B having the longitudinal direction parallel to the X axis direction are attached to the +Y and −Y side inside surfaces of the frame part 40a. Each of the guides 43A and 43B includes a guide rail having a U-shaped cross-section which includes a rectangular fixed portion fixed to the frame part 40a, and a pair of mutually-parallel upper and lower guide parts connected to the upper end and the lower end of the fixed portion. And a rectangular notch 43a is formed near the +X side edge part of the lower guide part.

Moreover, a pair of guide idlers 44A and 44B which are rotatable around the axis parallel to the Y-axis are secured to the +Y and −Y side inside surfaces of the frame part 40a near the −X side edge parts of the guides 43A and 43B, respectively.

Figure 5A:
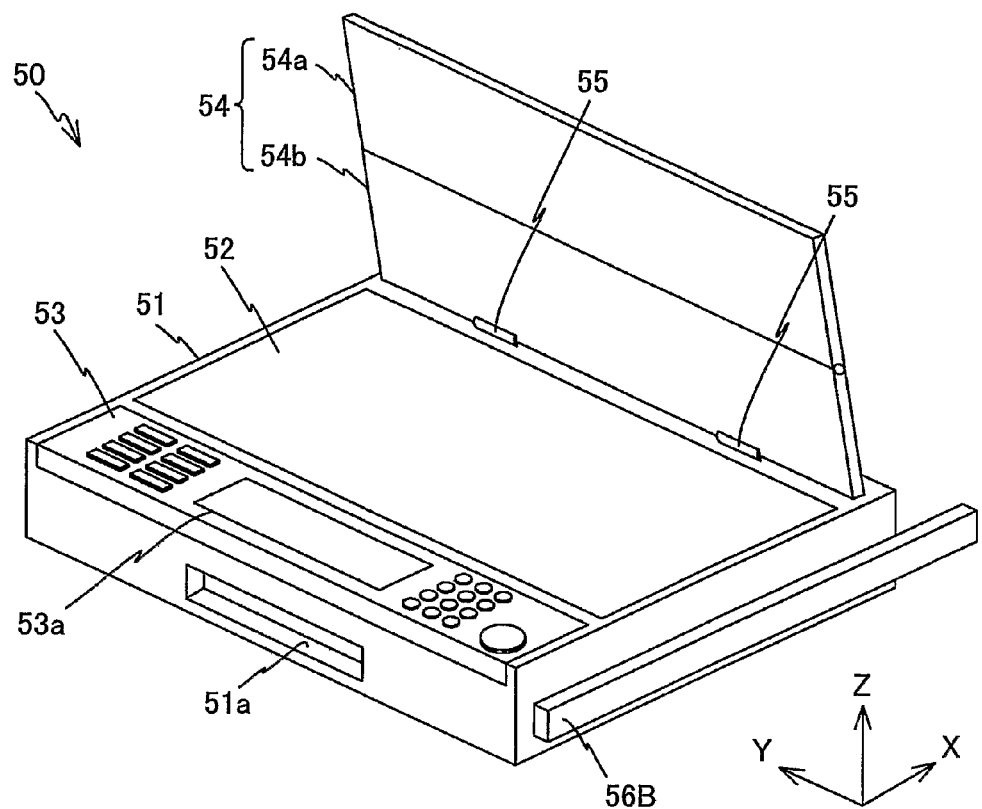
FIG. 5A and FIG. 5B are perspective views of a body of the image input device.
Figure 5B:
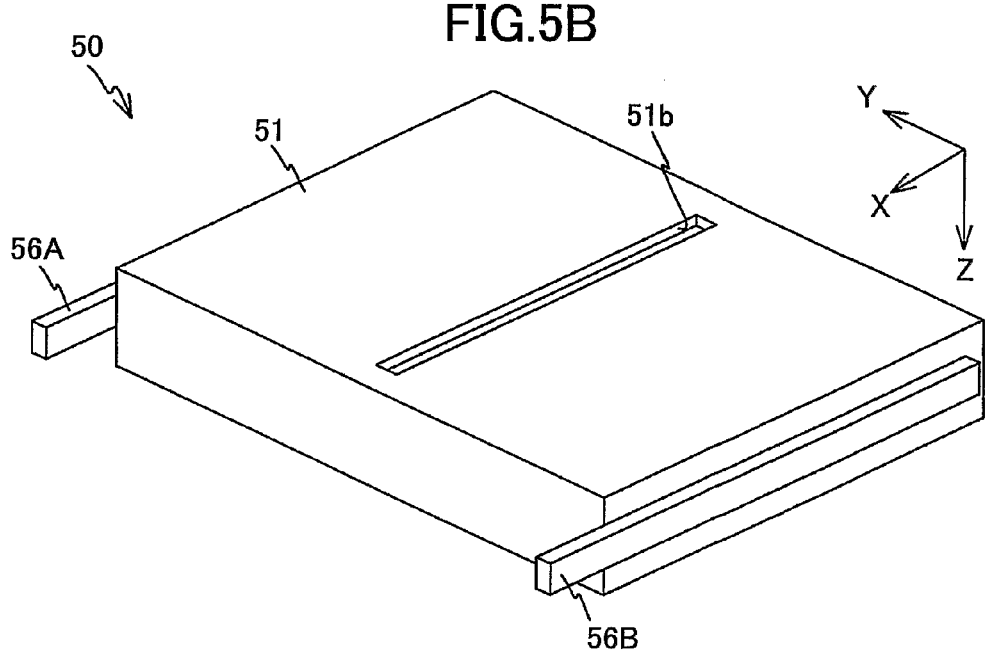

FIG. 5A and FIG. 5B are perspective views of the image input device body 50. As shown in FIG. 5A and FIG. 5B, the image input device body 50 has a housing 51 which is made of a hollow component having a rectangular shape and having the longitudinal direction parallel to the Y axis direction, a scanner 52 provided in the housing 51 so that the reading part is exposed to the top surface of the housing 51, and a cover 54 rotatably connected to the +X side edge part of the scanner 52 on the top surface of the housing 51 by a pair of hinges 55 such that the cover 54 is rotatable around the axis parallel to the Y-axis direction.

The housing 51 is made of a resin material formed by injection molding. An interface 53 is provided on the −X side of the top surface of the housing 51. In the interface 53, a plurality of push button switches for inputting a command relating to an image forming job which is performed by the image forming device body 12, and for inputting a command to control the scanner 52, and a touch panel 53a etc. are provided.

A handle 51a for pulling out the image input device body 50 from the base 40 in the X axis direction is formed in the −X side surface of the housing 51, and a pair of sliders 56A and 56B, each of which is made of a rectangular hollow component having the longitudinal direction parallel to the X axis direction, are attached to the +Y and −Y side outside surfaces of the housing 51, respectively.

Figure 6:
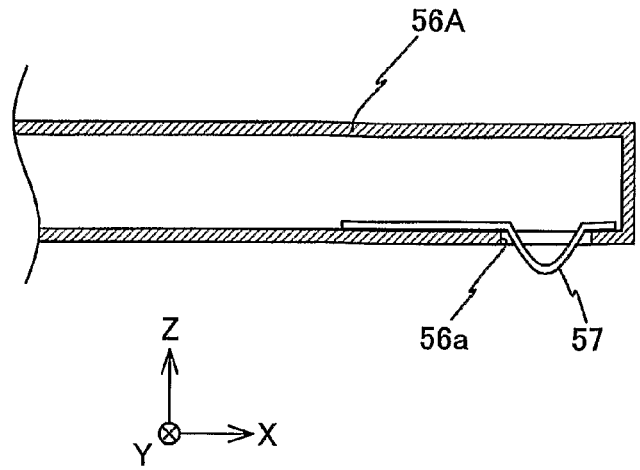
FIG. 6 is a cross-sectional view of a slider.

Moreover, as shown in FIG. 5B, a guide groove 51b which has the longitudinal direction parallel to the X axis direction is formed on the bottom surface (the −Z side surface) of the housing 51, the guide groove 51b extending from the center of the +X side edge part to the center of the −X side edge part. FIG. 6 is a cross-sectional view of the slider 56A. The slider 56B is essentially the same as the slider 56A, and a description thereof will be omitted.

As shown in FIG. 6, near the +X side edge part of the slider 56A (or the slider 56B), an elastic member 57 is provided inside the slider 56A (or the slider 56B), and this elastic member 57 has the longitudinal direction parallel to the X axis direction. The elastic member 57 is a sheet-like component in which the curved portion is formed near the +X side edge part of the elastic member 57, and the −X side edge part of the elastic member 57 is fixed to the top surface of the bottom wall of the slider 56A (or the slider 56B) so that the curved portion projects from a rectangular opening 56a which is formed in the bottom wall of the slider 56A (or the slider 56B).

Referring back to FIG. 5A, the scanner 52 includes a LED (light emitting diode) as a light source for scanning and reading a document. The scanner 52 is, for example, a small-thickness scanner having a thickness of 4 cm and being in conformity with the power-saving specifications. And the scanner 52 acquires image information of a document based on the input command received from the interface 53 on the top surface of the housing 51.

The cover 54 includes a set of sheet-like members 54a and 54b which have the longitudinal direction parallel to the Y axis direction. One of the longitudinal sides of the sheet-like member 54a and one of the longitudinal sides of the sheet-like member 54b are rotatably connected together, and the other of the longitudinal sides of the sheet-like member 54b is rotatably connected to the +Y side edge part of the top surface of the housing 51 via a pair of hinges 55.

The sliders 56A and 56B secured to the housing 51 of the image input device body 50 are respectively attached to the pair of guides 43A and 43B secured to the frame part 40a of the base 40 via the guide idlers 44A and 44B as shown in FIG. 4. Thus, the image input device body 50 is provided so that the image input device body 50 is capable of being pushed into and pulled out from the base 40 in the X-axis direction.

When the image input device body 50 is attached to the base 40, the connecting portion 40d provided in the base 40 is fitted to the guide groove 51b provided in the underside of the housing 51. The connection of the connecting portion 40d and the guide groove 51b restricts the stroke of the image input device body 50 when it is pulled out from the base 40, which prevents falling down of the image input device body 50 from the base 40.

Figure 7A:
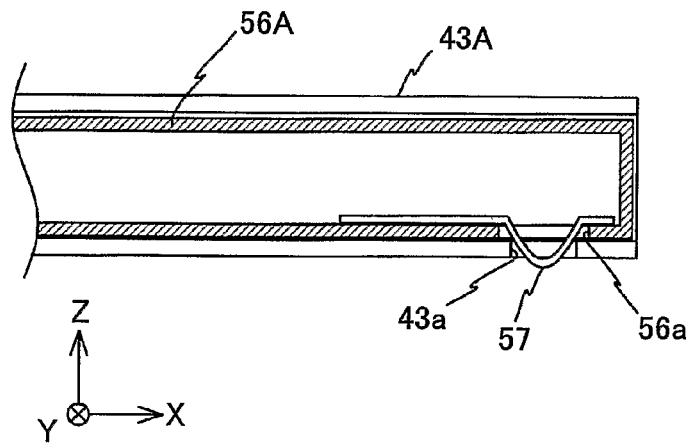
FIG. 7A and FIG. 7B are diagrams for explaining the operation of an elastic member.
Figure 7B:
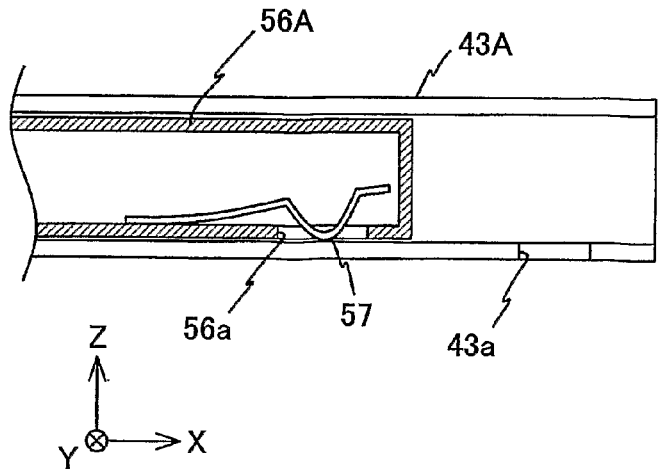

On the other hand, when the image input device body 50 is fully accommodated in the base 40, the curved portions of the elastic members 57 provided in the sliders 56A and 56B are respectively inserted in the cut-out grooves 43a formed in the guides 43A and 43B, as shown in FIG. 7A. When the image input device body 50 is pulled out from the base 40, the curved portions of the elastic members 57 are lifted by the guide parts on the lower side of the guides 43A and 43B and they are pushed into the inside of the guides 43A and 43B, as shown in FIG. 7B.

Accordingly, when the image input device body 50 is accommodated in the base 40; it is possible to prevent the image input device body 50 from being carelessly pulled out from the base 40, even if a small actuation force is operated in the X axis direction. And, once it is pulled out, the image input device body 50 can slide on the base 40 without stress.

In the image input device 30 including the base 40 and the image input device body 50 described above, the pair of sliding members 42A and 42B fixed to the base 40 are fitted to the guide members $14_1$ and $14_5$ fixed to the chamber 13 via the guide idlers $15_1$ and $15_5$, and the image input device 30 is detachably mounted in the first accommodated position inside the chamber 13.

Figure 8:
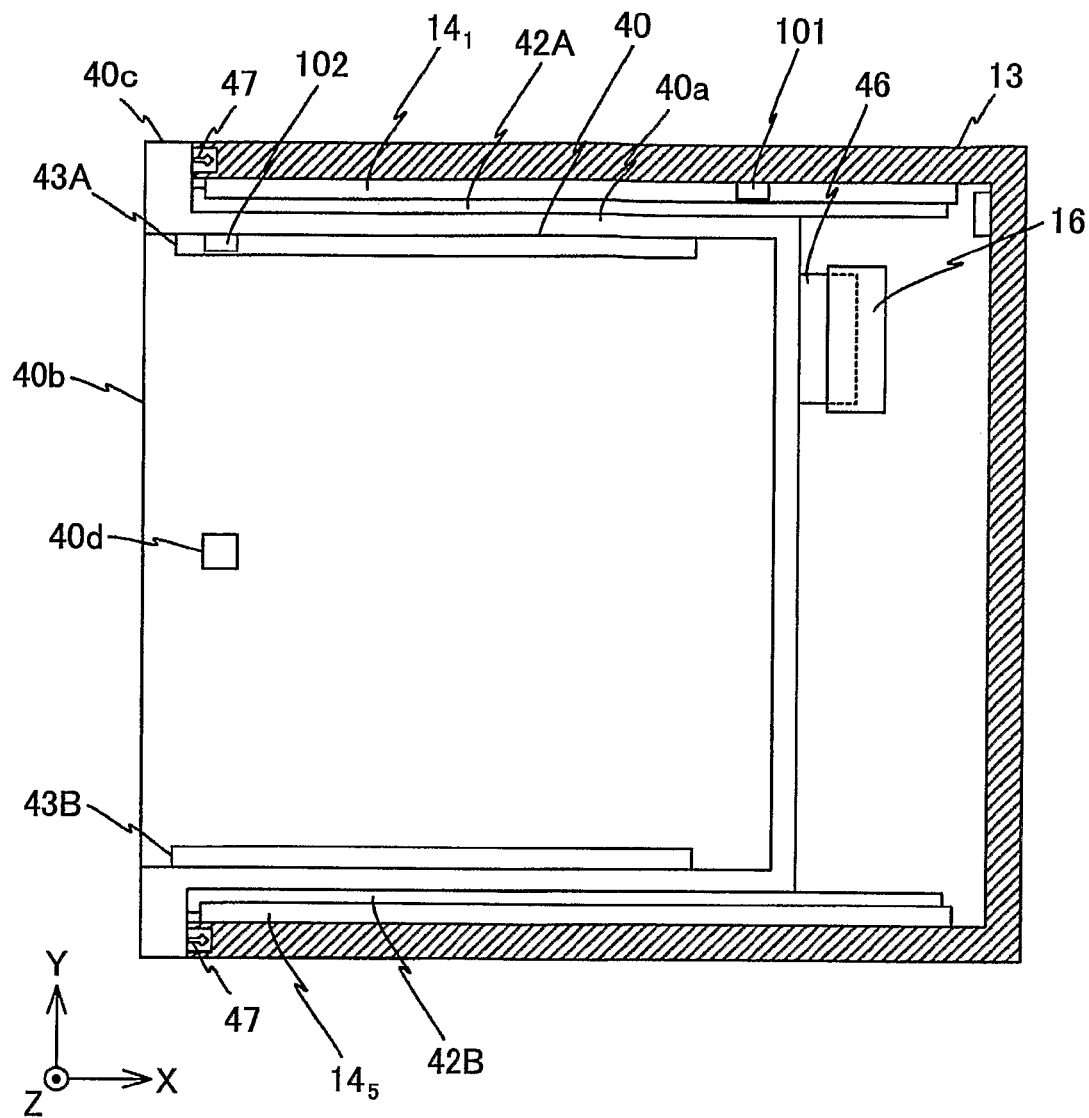
FIG. 8 is a cross-sectional view of the chamber.

FIG. 8 shows the condition of the base 40 in which the base 40 is in the first accommodated position of the chamber 13. As shown in FIG. 8, when the base 40 is accommodated in the first accommodated position of the chamber 13 as shown in FIG. 8, the connector 46 fixed to the −X side outside surface of the frame part 40a is connected to the connector 16 arranged inside the chamber 13, and the image input device body 50 accommodated in the base 40 is electrically connected to the main controller 100.

Figure 9:
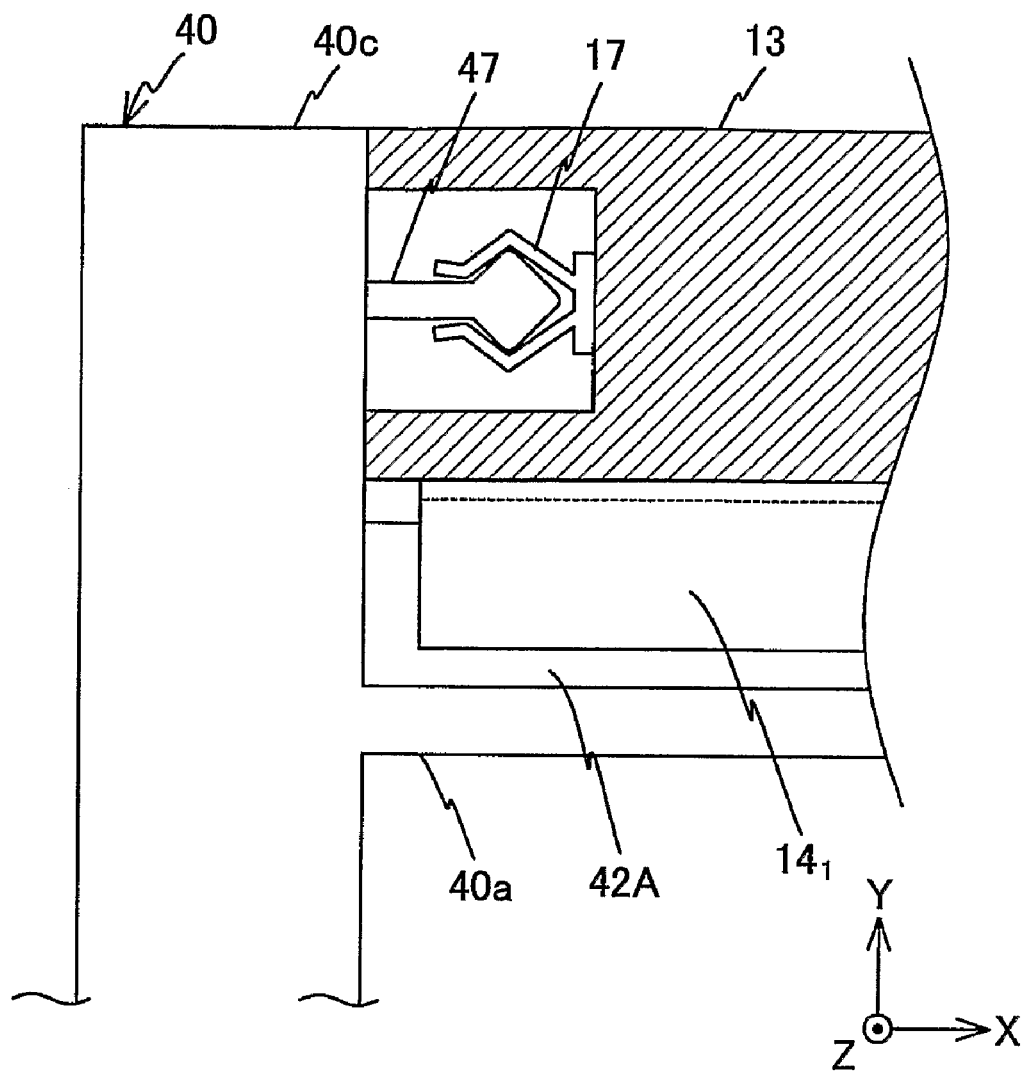
FIG. 9 is a diagram for explaining the operation of a lock pin and a clamper.
Figure 10:
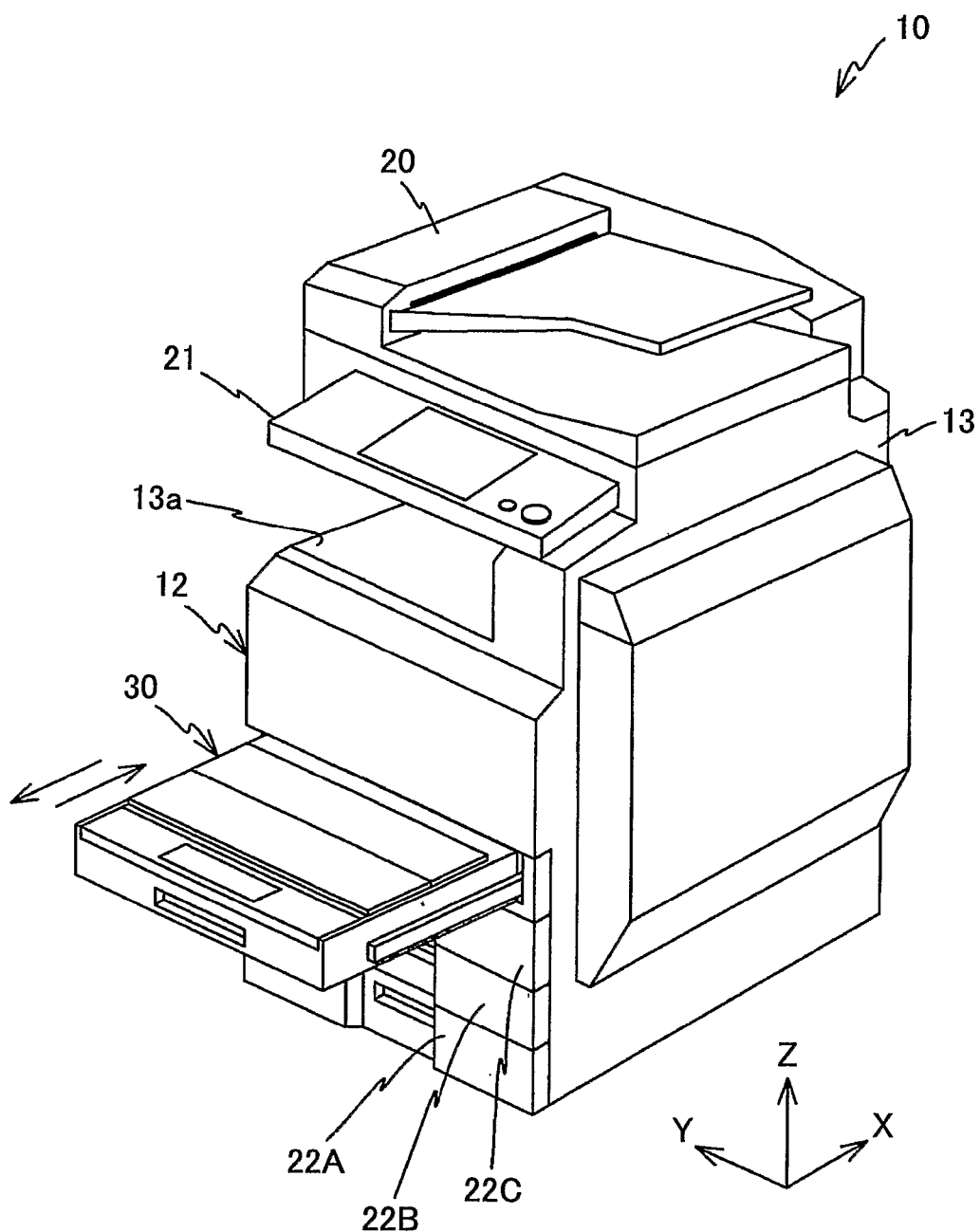
FIG. 10 is a diagram for explaining the operation of the image input device.

FIG. 9 is a diagram for explaining the operation of the lock pin 47 and the clamper 17. As shown in FIG. 9, the lock pin 47 is fixed to each of the +Y side edge part and the −Y side edge part of the +X side surface of the flange part 40c of the base 40. This lock pin 47 is locked by the clamper 17 provided in the chamber 13 at this time and the base 40 is fixed to the chamber 13. Thus, as indicated by the arrows in FIG. 10, the image input device body 50 accommodated in the base 40 is capable of being pushed in or pulled out from the image forming device body 12.

Referring back to FIG. 1, the operation panel 21 is constituted to include a housing having the longitudinal direction parallel to the Y axis direction, two or more push button switches provided on the top surface of the housing, and a touch panel.

Figure 11:
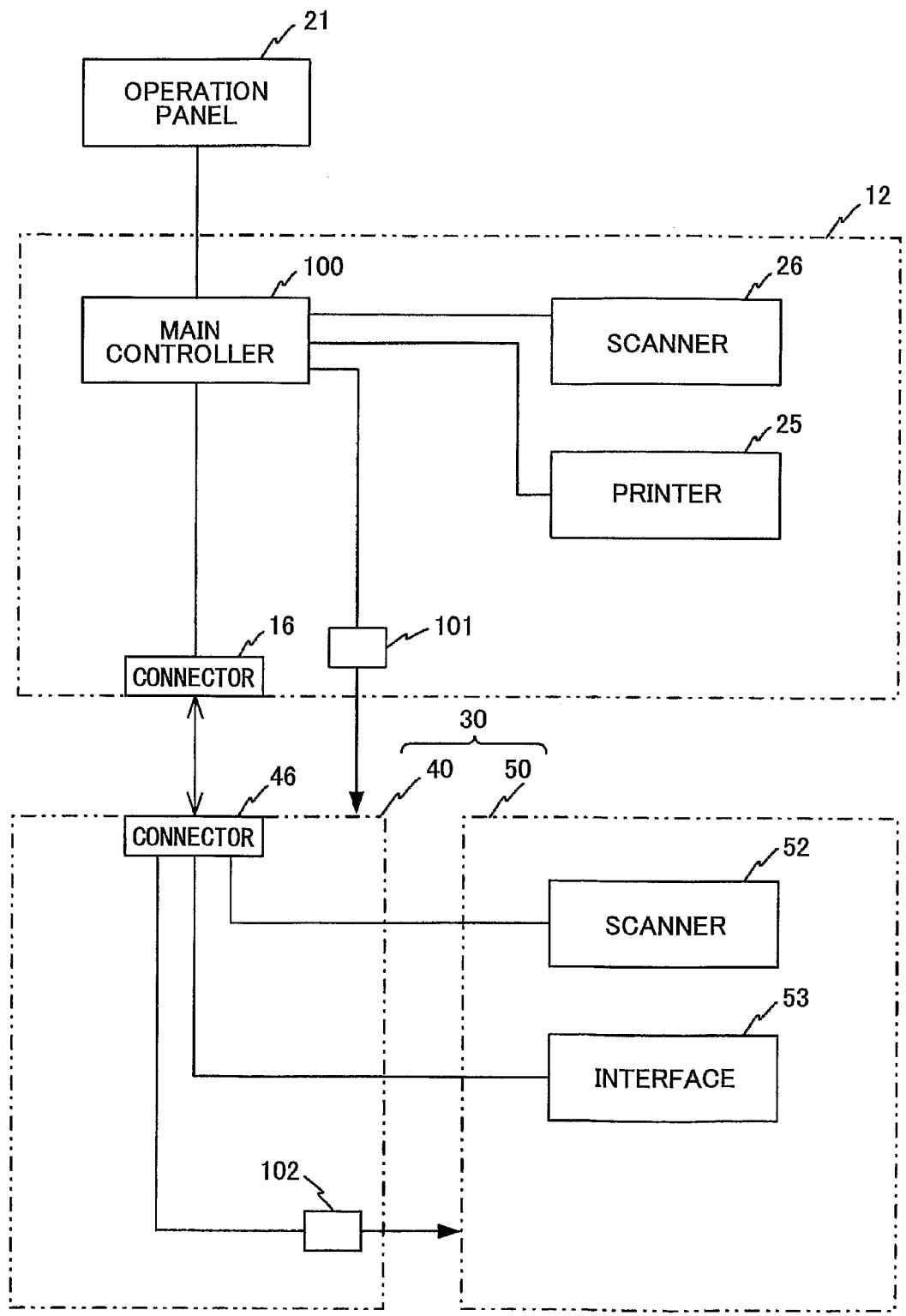
FIG. 11 is a block diagram of the image forming device.

FIG. 11 is a block diagram of the image forming device 10. As shown, the main controller 100 is a microcomputer including a CPU, a memory, etc. and controlling the image forming device 10. The main controller 100 drives the scanner 26 based on the command inputted from the operation panel 21, so that the scanner 26 reads image information of a document. And the printer 25 is driven by the main controller 100 based on the read image information, so that the printer 25 prints an image on a recording sheet 23.

As in the embodiment of FIG. 8, the main controller 100 detects whether the base 40 is mounted to the image forming device body 12, based on the output signal of the sensor 101 arranged near the +X side edge part of the guide member $14_1$ attached to the chamber 13. Moreover, the main controller 100 detects whether the image input device body 50 is pulled out from the base 40, based on the output signal of the sensor 102 arranged near the −X side edge part of the guide 43A of the base 40.

For example, a limit switch may be used as the sensor 101. When the base 40 is mounted to the image forming device body 12, the limit switch is set to ON state, and when the base 40 is removed from the image forming device body 12, the limit switch is set to OFF state. For example, a limit switch may be used as the sensor 102. When the image input device body 50 is pulled out from the base 40, the limit switch is set to ON state, and when the image input device body 50 is pushed into the base 40, the limit switch is set to OFF state.

The main controller 100 carries out switching of the operating states (valid/invalid) of the components 21, 26 and 30 of the image forming device in accordance with the following Table 1. Namely, when the sensors 101 and 102 are in ON state, the main control unit 100 sets the information inputted from the operation panel 21 and the scanner 26 in the invalid state, and controls the printer 25 to print an image on a recording sheet 23 based on the information inputted from the image input device 30.

When the sensor 101 is in ON state and the sensor 102 is in OFF state, the main controller 100 sets the information inputted from the image input device 30 in the invalid state, and controls the printer 25 to print an image on a recording sheet 23 based on the information inputted from the operation panel 21 and the scanner 26.

When the sensor 101 is in OFF state, it is determined that the image input device 30 is not located in the first accommodated position or the usual sheet feeding tray is attached. In this case, the main controller 100 controls the printer 25 to print an image on a recording sheet 23 based on the information inputted from the operation panel 21 and the scanner 26.

TABLE 1

|  | Sensor 102 ON: | Sensor 102 OFF: |
|---|---|---|
| Sensor 101 ON: | operation panel 21 invalid, scanner 26 invalid, image input device 30 valid | operation panel 21 valid, scanner 26 valid, image input device 30 invalid |
| Sensor 101 OFF: | operation panel 21 valid scanner 26 valid | |

Figure 12:
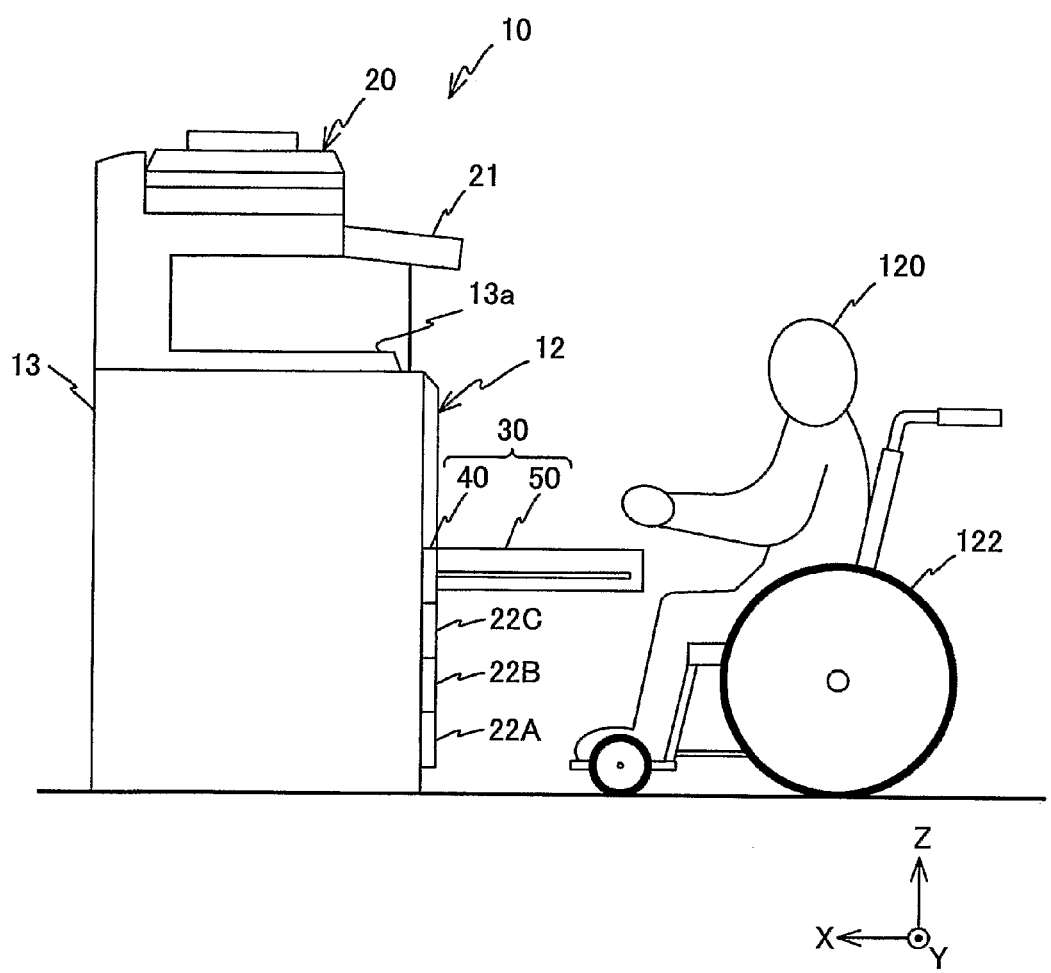
FIG. 12 is a diagram for explaining a manner of using the image forming device.

FIG. 12 shows the manner of using the image forming device 10 by a user 120 who uses a wheelchair 122. As shown in FIG. 12, when the user 120 uses the image forming device 10, the image input device body 50 is pulled out, and then the cover 54 is opened as shown in FIG. 5A and a document is set to the scanner 51. And the user 120 inputs a command from the interface 53 of the image input device body 50, so that printing of an image on a recording sheet 23 is performed by the printer 25 provided in the image forming device body 12, and the recording sheet 23 on which the image is printed is ejected to the paper output tray 13a.

In the image forming device 10 of this embodiment, the image input device 30 is mounted in the first accommodated position where a sheet feeding tray may be mounted. In order to shorten the transporting passage of a recording sheet as much as possible in an image forming device, such as a copier, it is desirable that the sheet feeding tray and the printer are arranged in close proximity to each other. Moreover, in order to shorten wiring distance for transmitting image information of a document and a command relating to an image forming job, it is desirable that the printer, the scanner and the operation panel are arranged in close proximity to each other. And it is desirable for healthy persons that the operation panel for inputting a command to the image forming device, the scanner for reading image information of a document, and the paper output tray are arranged in the upper portion of the image forming device body.

In order to satisfy the above-mentioned requirements, the image forming device 10 of this embodiment is provided so that the scanner 26, the operation panel 21, the printer 25, and the sheet feeding trays 22A, 22B, and 22C are arranged in this order from the upper part to the lower part, as shown in FIG. 2. For this reason, the image input device 30 which is mounted in the first accommodated position is located in the position lower than the position of the printer 25 and higher than the lower end of the image forming device body 12 by a distance ranging from 37 cm to 50 cm. Thus, it is possible to input image information of a document from the position lower than that of the scanner 26 and input a command from the position lower than that of the operation panel 21.

Especially when the user 120 who uses the auxiliary tool, such as the wheelchair 122, uses the image forming device 10, as shown in FIG. 12, the image input device body 50 of the image input device 30 is pulled out from the image forming device body 12. This allows the visibility to a document to be secured for the user 120. And inputting image information of a document and inputting a command to the image forming device body 12 can be performed from the position lower than the position of the operation panel 20 or the scanner 26, without using the scanner 26 and the operation panel 21. Therefore, it is possible to improve the ease of operation of the image forming device 10.

Since the image input device 30 can be mounted in the first accommodated position of the image forming device body 12, it is not necessary to provide the image forming device body 12 with an additional mounting device or mounting part for mounting the image input device 30. The existing design for the layout of the components provided in the image forming device 10 can be used with no need for design changes, and it is possible to avoid enlargement and high cost of the image forming device.

The image input device body 50 of the image input device 30 can be pushed in or pulled out from the base 40 mounted in the first accommodated position. When performing reading of image information of a document, inputting of a command, etc. using the operation panel 21 and the scanner 26, it is possible to secure the work space around the image forming device body 12 by mounting the image input device body 50 in the base 40.

The image input device 30 is detachably mounted to the image forming device body 12. It is possible for the user to selectively determine one of the image input device 30 and the sheet feeding tray which should be mounted in the first accommodated position, according to the use condition of the image forming device 10.

In the image forming device 10 of the above embodiment, the case where the image input device body 50 is capable of being pushed into or pulled out from the base 40 has been explained. Alternatively, the image forming device may be provided so that the image input device body 50 is capable of being pushed into or pulled out from the image forming device body 12, without using the base 40.

Figure 13:
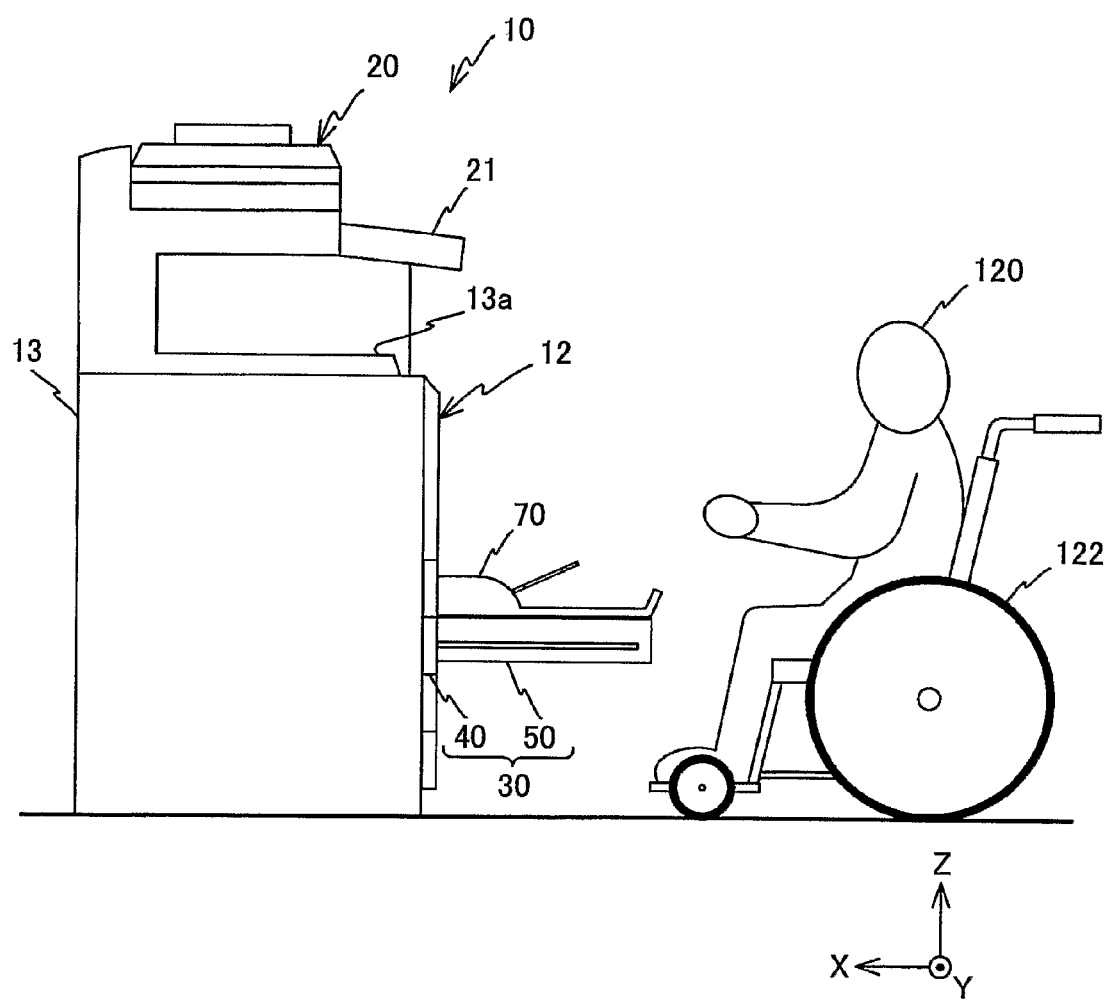
FIG. 13 is a diagram for explaining a manner of using the image forming device.

In the image forming device 10 of the above embodiment, the case where the image input device 30 is mounted in the first accommodated position. Alternatively, the image input device 30 may be mounted in any of the second accommodated position, the third accommodated position, and the fourth accommodated position. In this case, for example, as shown in FIG. 13, the image input device 30 may be mounted in the second accommodated position and the built-in type automatic sheet feeder unit 70 may be mounted in the first accommodated position.

Figure 14:
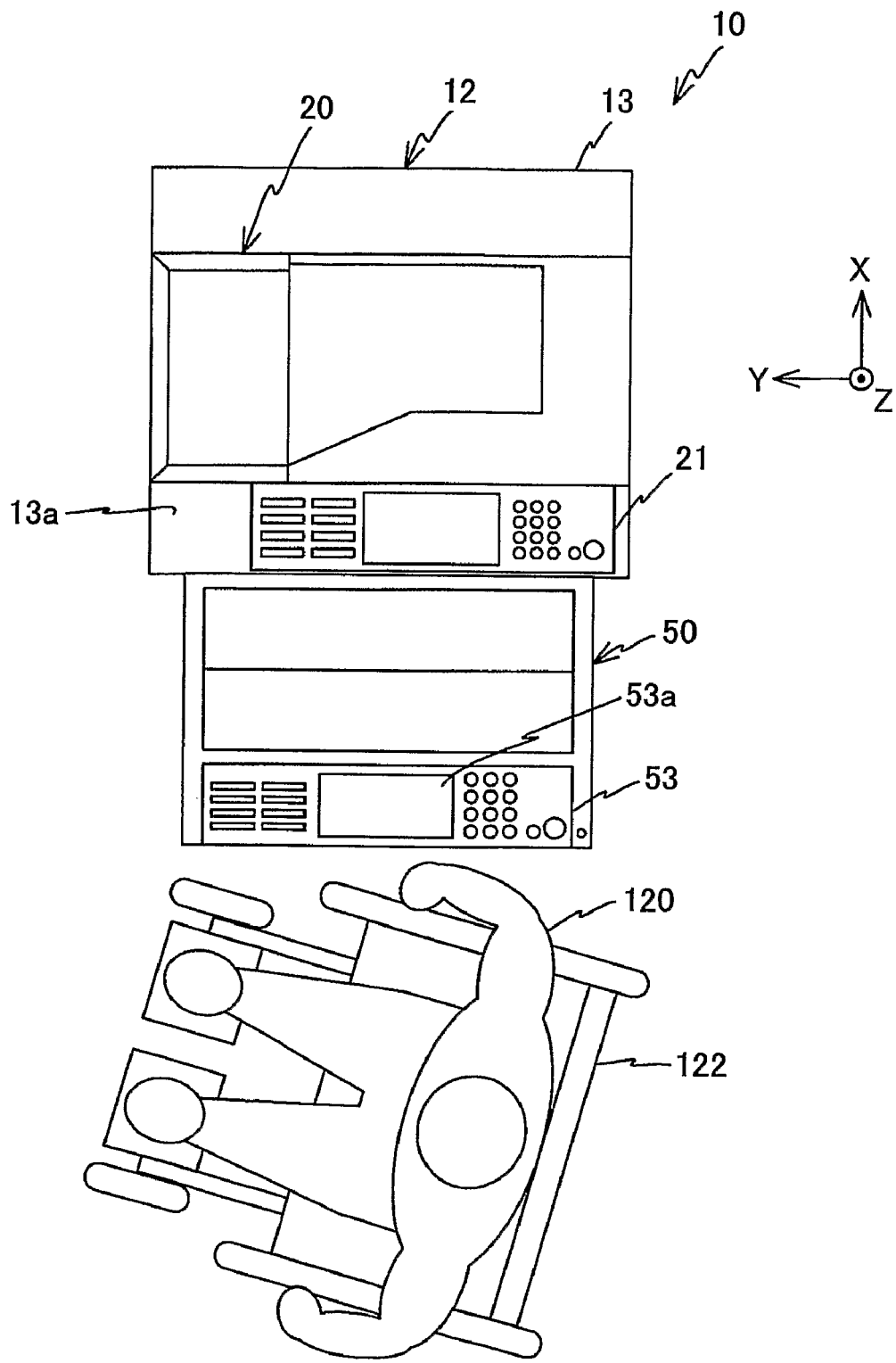
FIG. 14 is a diagram for explaining a manner of using the image forming device.

The image forming device may be provided so that the display indication of the touch panel 53a of the interface 53 provided in the image input device body 50 is rotated by 90 degrees so that the Y axis direction is turned into a vertical direction to the user. This allows the user 120 to easily operate the image input device 30 not only when the user faces the interface 53 but also when the image input device 30 is located in the right-hand side of the user as shown in FIG. 14, or located in the left-hand side of the user.

In this case, a push-button switch for rotating the direction of a display screen of the touch panel 53a 90 degrees to make the Y axis direction of the display screen match the vertical direction may be provided in the interface 53, and the direction of the display screen may be rotated 90 degrees by a single pressing action of the push button switch in the interface 53.

In the image forming device 10 of this embodiment, when the image input device 30 is mounted to the image forming device body 12, the image input device body 50 is electrically connected with the main controller 100. The main controller 100 communicates with the image input device body 50, and the main controller 100 acquires the information relating to the image input device 30 as a result of the communication.

Alternatively, the main controller 100 may be configured to acquire the information relating to the image input device 30, based on the configuration of a connector, without performing the communication between the main controller 100 and the image input device body 50.

In the image forming device 10 of the above embodiment, the case where the sheet feeding trays 22A-22C having the same configuration are mounted to the image forming device body 12 has been explained. Alternatively, the image forming device may be configured so that a mass sheet feeding tray is mounted to the image forming device body 12, instead of one of the sheet feeding trays. In this case, it is possible to easily mount the mass sheet feeding tray by changing the spacing of the guide members 14₁-14₈ shown in FIG. 3.

Next, a modification of the above-mentioned embodiment of the image input device 30 will be explained.

In the following, the elements which are the same as corresponding elements of the image input device 30 in the above embodiment are designated by the same reference numerals, and a description thereof will be omitted.

Figure 15A:
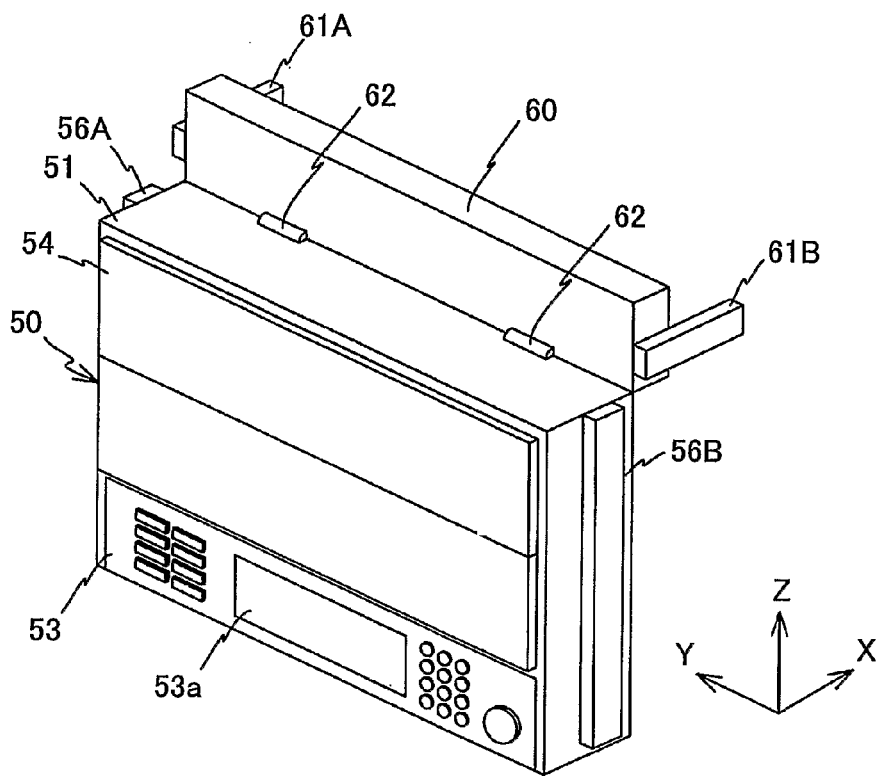
FIG. 15A and FIG. 15B are perspective views of the body of the image input device in a modification of the embodiment of the invention.
Figure 15B:
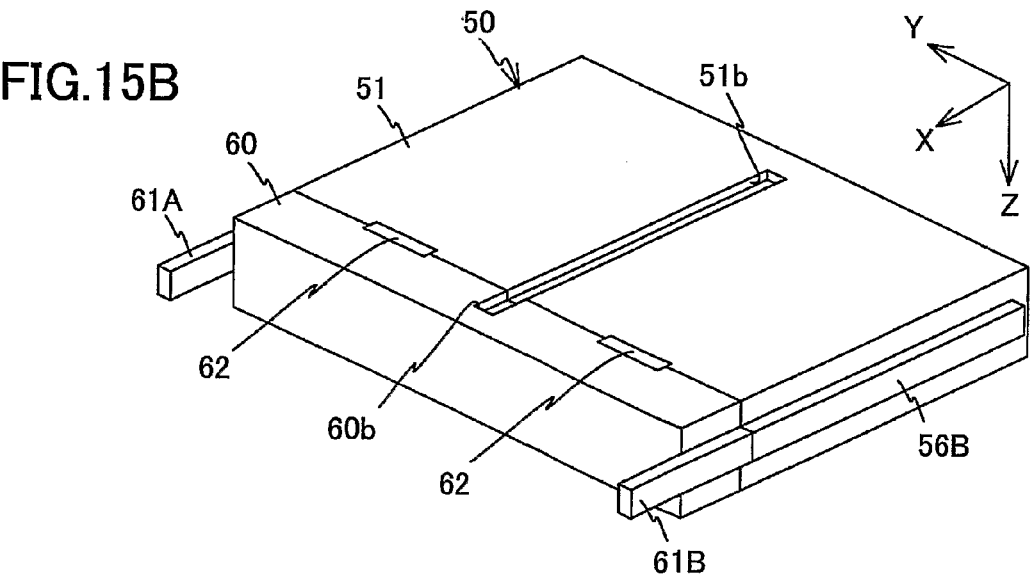

FIG. 15A and FIG. 15B are perspective views of a body of an image input device 30A in a modification of the embodiment of the invention. As shown in FIG. 15A, the image input device 30A includes a joint 60 having a rectangular shape and having the longitudinal direction parallel to the Y axis direction. The sliders 61A and 61B which are slidable on the guides 43A and 43B provided in the base 40 are attached to the +Y and −Y side surfaces of the joint 60.

The image input device body 50 is connected to the lower end of the −X side surface of the joint 60 through the torque hinge 62 so that the image input device body 50 is rotatable around the axis parallel to the Y-axis. As shown in FIG. 15B, the guide groove 60b which is continuous to the guide groove 51b formed in the housing 51 is formed in the −X side edge part of the underside (or the −Z side surface) of the joint 60.

Figure 16:
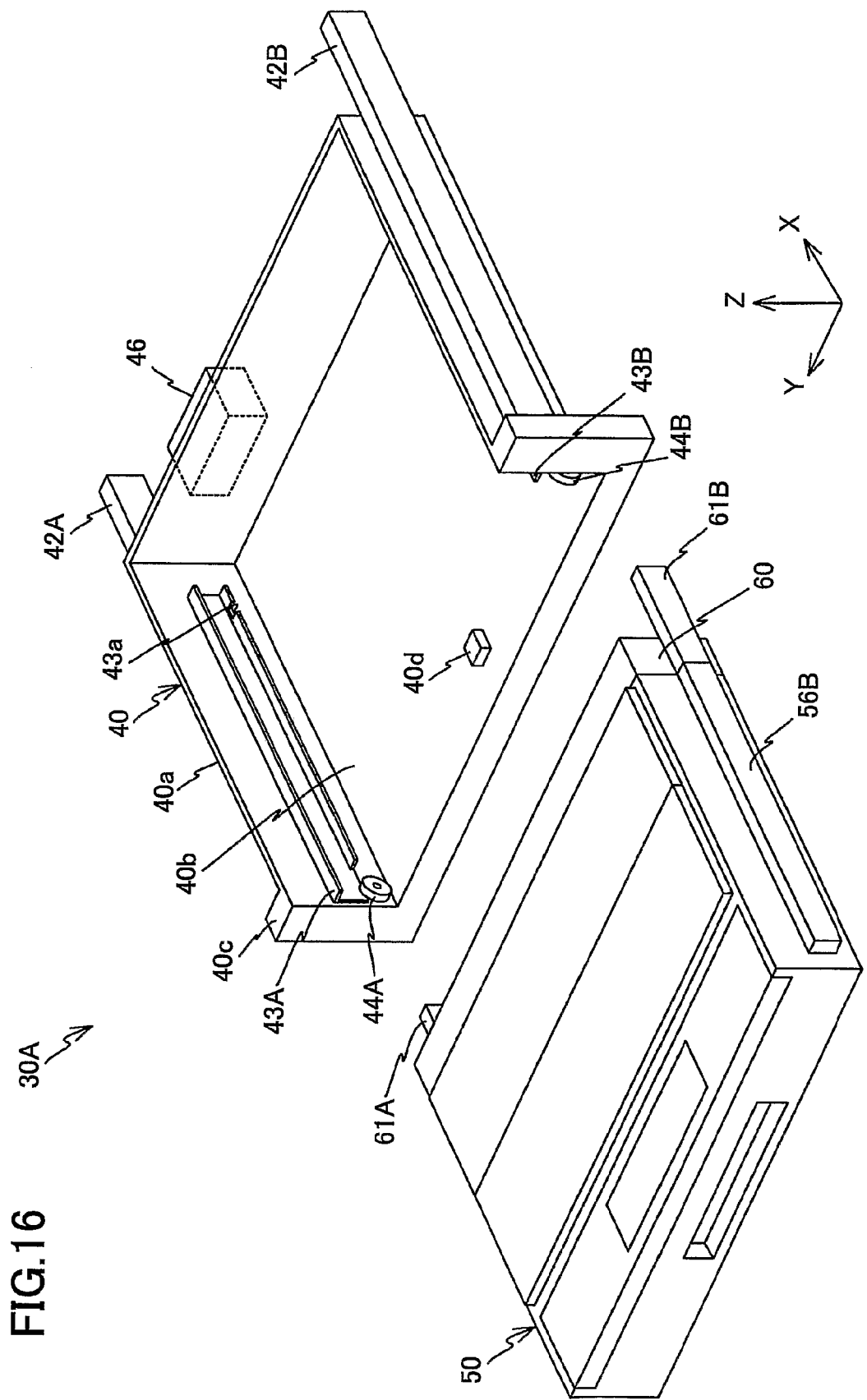
FIG. 16 is an exploded perspective view of the image input device of the modification.

In the image input device body 50 and the joint 60 which are connected as shown in FIG. 16, when the +X side surface of the housing 51 is in contact with the −X side surface of the joint 60, the pair of the sliders 56A and 56B provided in the image input device body 50 and the pair of the sliders 61A and 61B provided in the joint 60 are mounted to the pair of the guides 43A and 43B provided in the base 40 through the guide idlers 44A and 44B. The image input device body 50 is capable of being pushed into or pulled out from the base 40. And the connecting portion 40d of the base 40 is moved from the guide groove 51b of the housing 51 to the guide groove 60b of the joint 60 when the image input device body 50 is pulled out, and the connecting portion 40d contacts the +X side wall of the guide groove 60b. It is possible to prevent falling down of the image input device body 50 from the base 40.

Figure 17:
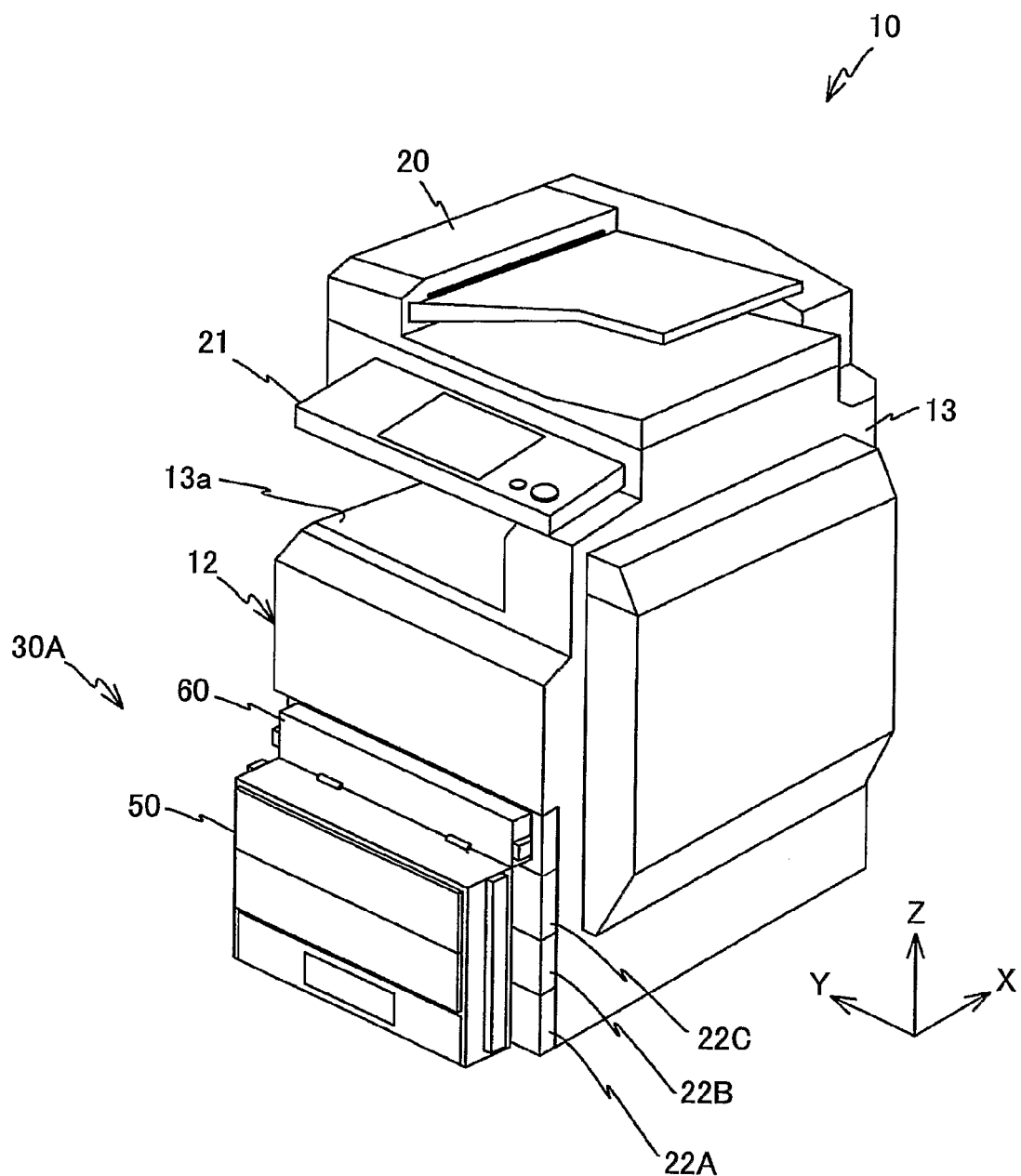
FIG. 17 is a diagram for explaining the operation of the image input device of the modification.

In the image input device 30A, the horizontal position of the image input device body 50 is maintained by the holding force of the torque hinge 62 when the image input device body 50 is pulled out from the base 40. However, when the force exceeding the necessary level is exerted on the top surface, the image input device body 50 is rotatable to the image forming device body 12 as shown in FIG. 17. Thus, when the excessively large force is exerted on the image input device body 50 pulled out from the base 40, the image input device body 50 is rotated to the image forming device body 12, thereby preventing the image input device 30A from being damaged.

In the above modification, the case where the image input device body 50 is connected to the joint 60 via the torque hinge 62 has been explained. Alternatively, the image input device body 50 may be connected to the joint 60 via a ratchet mechanism.

The cover 54 of the image input device body 50 is rotatable around the axis parallel to the Y-axis, as shown in FIG. 5A. Thereby, the cover 54 is rotated integrally with the image input device body 50 when rotating the image input device body 50 is rotated to the image forming device body 12. It is possible to avoid opening or closing the cover 54 carelessly, and damaging of the cover 54 can be prevented.

The work space around the image forming device body 12 can be secured by the rotation of the image input device body 50 to the image forming device body 12. Since the inclination angle of the image input device body 50 can be arbitrarily changed when a serviceman performs maintenance service, it is possible to raise the effectiveness of maintenance service.

Any of various image input devices may be connected to the image forming device body 12. For example, any of corresponding image input devices in the cases of image forming devices using the interface including only the touch panel, using A4-size recording sheets or A3-size recording sheets for being scanned and using monochrome images or color images for being formed may be connected. As the scanner 52, either the scanner using the scanning method or the scanner using the image pick-up method may be used.

The present invention is not limited to the above-described embodiments and variations and modifications may be made without departing from the scope of the invention.

Furthermore, the present application is based upon and claims the benefit of priority of Japanese patent application No. 2006-070121, filed on Mar. 15, 2006, the entire contents of which are incorporated herein by reference.

The invention claimed is:

1. An image forming device which acquires image information of a document and forms an image on a recording sheet, comprising:
   an image forming device body having a first reading unit and a processing unit, wherein the first reading unit acquires image information of a document and the processing unit forms an image on a recording sheet based on the image information acquired by the first reading unit; and
   an image input device having a second reading unit, the second reading unit acquiring image information of a document, and the image input device being arranged in the image forming device body at a position lower than a position of the first reading unit,
   wherein the image input device is provided so that the image input device is capable of being pushed in the image forming device body or pulled out from the image forming device body,
   wherein the image forming device body is provided with a plurality of mounting mechanisms to which a plurality of sheet feeding trays, each containing a plurality of recording sheets, are detachably mounted respectively, and the image input device is detachably mounted to one of the plurality of mounting mechanisms.

2. The image forming device according to claim 1, wherein the image input device comprises an interface which inputs a command to the image forming device body.

3. The image forming device according to claim 2, wherein the interface comprises a touch panel which is provided so that a displaying direction is capable of being changed.

4. The image forming device according to claim 3, wherein the displaying direction is changed by rotating the displaying direction 90 degrees.

5. The image forming device according to claim 3, wherein the displaying direction is changed by a single pressing action.

6. The image forming device according to claim 1, wherein the processing unit is provided with a printer which prints an image on a recording sheet, and the image input device is arranged at a position lower than a position of the printer.

7. The image forming device according to claim 1, wherein the image input device is provided so that the image input device is rotatable, when the image input device is pulled out from the image forming device body, around an axis perpendicular to both a pull-out direction of the image input device and a vertical direction.

8. The image forming device according to claim 1, wherein the image input device is provided to be rotatable around an axis which is perpendicular to both a pull-out direction of the image input device and a vertical direction, and the image input device is provided with a document holding plate which holds a document placed on the second reading unit.

9. The image forming device according to claim 1, wherein a mounting mechanism comprises a locking mechanism which regulates pushing and pulling of the image input device to and from the image forming device body.

10. The image forming device according to claim 1, wherein the image forming device body is provided with a control device which controls the processing unit, and the image input device is electrically connected to the control device when the image input device is attached to the image forming device body.

11. The image forming device according to claim 10, wherein the control device is provided so that, when the image input device is pulled out from the image forming device body, the control device performs only processing based on a command inputted to an interface.

12. The image forming device according to claim 10, wherein the control device is provided to acquire, when the image input device is attached to the image forming device, information relating to the image input device.

13. An image input device for use in an image forming device, the image input device inputting information relating to an image forming job which is executed by the image forming device, the image input device comprising:
   a holding member which is detachably mounted to a sheet-feeding-tray mounting part provided in the image forming device; and
   an image input device body provided in the holding member so that the image input device body is capable of entering or leaving the holding member.

14. The image input device according to claim 13, wherein the image input device body is provided with a scanner which reads image information of a document.

15. The image input device according to claim 13, wherein the image input device body is provided with an interface which inputs a command relating to the image forming job.

16. The image input device according to claim 13, wherein the holding member is provided with a locking mechanism which regulates pushing and pulling of the image input device body to and from the holding member.

* * * * *